(12) United States Patent
Smith

(10) Patent No.: US 8,063,998 B2
(45) Date of Patent: Nov. 22, 2011

(54) METHODS AND SYSTEMS OF DISPLAYING ADVERTISEMENT OR OTHER INFORMATION AND CONTENT VIA MOBILE PLATFORMS

(76) Inventor: Earnest Smith, San Diego, CA (US)

( * ) Notice: Subject to any disclaimer, the term of this patent is extended or adjusted under 35 U.S.C. 154(b) by 943 days.

(21) Appl. No.: 11/983,646

(22) Filed: Nov. 9, 2007

(65) Prior Publication Data

US 2009/0133077 A1    May 21, 2009

Related U.S. Application Data

(60) Provisional application No. 60/857,952, filed on Nov. 10, 2006.

(51) Int. Cl.
 *H04N 5/64* (2006.01)
 *H04N 7/18* (2006.01)
 *B60R 13/00* (2006.01)
 *G06Q 30/00* (2006.01)

(52) U.S. Cl. .......... 348/837; 725/75; 296/21; 705/14.62

(58) Field of Classification Search .............. 725/75; 348/837; 296/21; 705/14.62
See application file for complete search history.

(56) References Cited

U.S. PATENT DOCUMENTS

| | | | |
|---|---|---|---|
| 2003/0189589 A1* | 10/2003 | LeBlanc et al. | 345/723 |
| 2006/0268233 A1* | 11/2006 | Sato | 353/13 |
| 2007/0149284 A1* | 6/2007 | Plavetich et al. | 463/37 |
| 2007/0195079 A1* | 8/2007 | Boudewyns et al. | 345/207 |

* cited by examiner

*Primary Examiner* — Hoang-Vu A Nguyen-Ba
(74) *Attorney, Agent, or Firm* — David R Preston; David R Preston & Associates

(57) ABSTRACT

The methods and systems of the present invention are particularly adaptable as additions in the form of displaying means, such as monitors, that can works in conjunction with any type of motor vehicle including cars, box trucks, boats, ships, yachts, trains, recreational vehicles, motorcycles, tractor trailer trucks, or motor scooters. The methods of the present invention can be combined as an addition to any part of the motor vehicle in order to turn the motor vehicle into a mobile displaying platform for displaying advertisements or other information.

13 Claims, 1 Drawing Sheet

METHODS AND SYSTEMS OF DISPLAYING ADVERTISEMENT OR OTHER INFORMATION AND CONTENT VIA MOBILE PLATFORMS

RELATED DOCUMENTS

The present application claims benefit of priority to U.S. Provisional Application Ser. No. 60/857,952, filed Nov. 10, 2006, entitled "Methods of Displaying Advertising or Other Information Via Mobile Platforms" which is incorporated herein by reference in its entirety.

FIELD OF INVENTION

The present invention relates generally to the field of displaying advertising or other information, and particularly to displaying advertisements or interactive games on a monitor configured to display to the outside of a vehicle employing a live wireless feed for displaying recorded or live content from a remote location or broadcast station ("call center").

BACKGROUND OF THE INVENTION

A variety advertising methods are available, for example on television and internet or in various printed publications, or different types of displays such as billboards or other types of displays on buses or buildings.

Many of the available methods of advertising are not as effective as they were once. For example, television is still by far the most effective and dynamic medium and is the most heavily purchased medium for all of the top advertisers. However, the problem with television is fragmentation. Television would have been considered a captive medium in the 1950's, but today, with satellite and cable TV delivery to nearly 80% of all TV homes, and the penetration of VCR, DVD, and remote control, television has become hit or miss medium for advertising at best. Most of these TV households are receiving 50 to 150 different channel viewing choices at one time. Advertising in this cluttered environment is getting lost, becoming less effective, and in some cases not available at all, for example HBO, The Disney Channel, Pay-per-view, etc. Advertising agencies have over used many forms of advertising in order to get peoples attention by using commercials, billboards, magazine ads, and the internet. Now people are bored with all of that and are ready for something new.

While there has been a trend to provide more effective and targeted advertising, further improvements in the effectiveness in getting information to potential consumer are desirable, and the present invention addresses the existing problems and provides related benefits.

SUMMARY OF THE INVENTION

The methods and systems of the present invention are particularly adaptable as additions in the form of displaying means, such as monitors, that can works in conjunction with any type of motor vehicle including cars, box trucks, boats, ships, yachts, trains, recreational vehicles, motorcycles, tractor trailer trucks, or motor scooters. The methods of the present invention can be combined as an addition to any part of the motor vehicle in order to turn the motor vehicle into a mobile displaying platform for displaying advertisements or other information. For example, the monitor, preferably a high definition monitor, may be installed inside the vehicle or outside the vehicle facing away from the vehicle to be viewed by viewers on the outside of the vehicle. In case of large trucks such as trailer truck or big rigs, the monitor may be installed on one or more areas of the outside of walls of the trailer of the truck. The call center of the present invention may employ one or more monitors, computers, cameras, microphones, and speakers that can deliver/send live content to the vehicle's monitor from a remote location.

The present invention provides to the video gaming and advertising world at large the ability to reach a targeted audience that is a better bet to use their products and/or buy their products or services than those offered with other styles of advertising vehicles. The present invention is designed to deliver messages to consumers about brand names. For a mass marketer, keeping its brand name and Images in front of consumers is crucial to its survival.

One aspect of the present invention includes an audio/video based interactive system, including: one or more motor vehicles having a front end, a rear end, and a cabin having a plurality of windows in connection with at least a first side wall and a second side wall; one or more monitors including receiving means and one or more speakers, the one or more monitors being able to wirelessly receive and display live or pre-recorded content, the one or more monitors mounted inside or outside the cabin and facing outwardly from the motor vehicle for viewing from the outside of the one or more motor vehicles; and a call center able to generate and broadcast the live or pre-recorded content via one or more transmission means to the one or more monitors.

Another aspect of the present invention includes two or more of the motor vehicles, the two or more motor vehicles being able to communicate and broadcast the live or pre-recorded content with one another the call center Another aspect of the present invention includes two or more motor vehicles, wherein one or more of the two or more motor vehicles are able to act as the call center by further having a remote camera including a microphone, the remote camera being able to generate and broadcast live or pre-recorded content via one or more transmission means to the other vehicles of the system.

Another aspect of the present invention includes two or more motor vehicles that are operatively liked together via one of the one or more vehicles that is able to act as the call center, wherein two or more gamers are able to play a video games with one another on the monitors.

DETAILED DESCRIPTION OF THE INVENTION

Introduction

Figure 1:
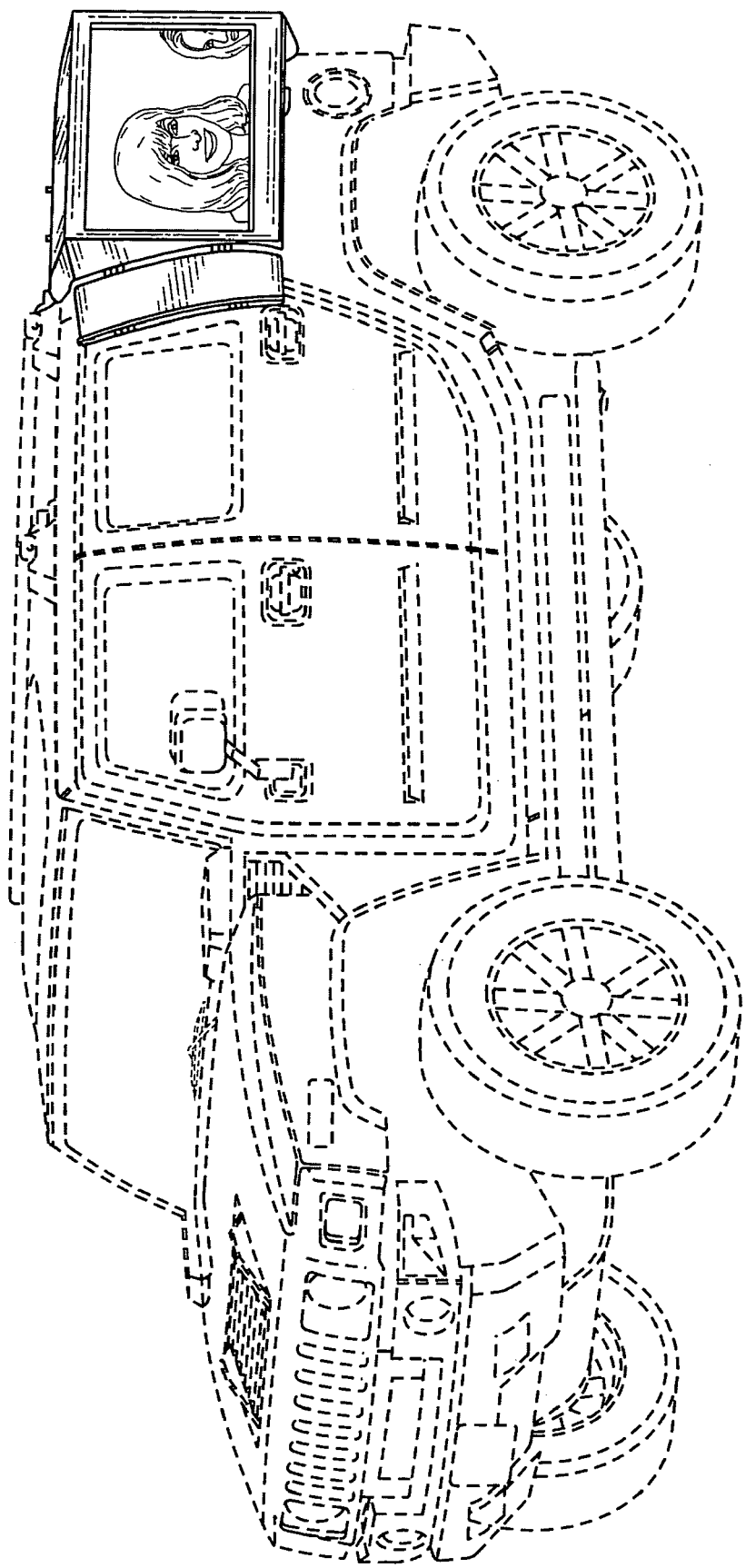
FIG. 1 shows perspective view of a motor vehicle with a monitor mounted on the outside of its cabin.

The present invention recognizes that advertising and dissemination of product or service knowledge, and video gaming can be targeted and provided to potential consumers more effectively by providing a new medium and enhanced impressions based on the audio/video based interactive systems of the present invention.

As a non-limiting introduction to the breadth of the present invention, the present invention includes several general and useful aspects, including:

1) An audio/video based interactive system, including:
   a) one or motor vehicles comprising a front end, a rear end, and a cabin comprising a plurality of windows in connection with at least a first side wall and a second side wall;

b) one or more monitors comprising one or more speakers, the one or more monitors being able to wirelessly receive and display live or pre-recorded content, the one or more monitors mounted inside or outside the cabin and facing outwardly from the one or more motor vehicles for viewing from the outside of the motor vehicle; and
c) a call center able to generate and broadcast the live or pre-recorded content via one or more transmission means to the one or more monitors.
2) An audio/video based interactive system, including one or more motor vehicles further including a remote camera including a microphone, the remote camera being able to generate and broadcast live or pre-recorded content via one or more transmission means to the call center enabling a complete audio/video conferencing function.
3) An audio/video based interactive system, including two or more motor vehicles, wherein one or more of the two or more motor vehicles are able to act as the call center by further having a remote camera including a microphone, the remote camera being able to generate and broadcast live or pre-recorded content via one or more transmission means to the other vehicles of the system.
4) An audio/video based interactive system, including two or more motor vehicles that are operatively liked together via one of the one or more vehicles that is able to act as the call center, wherein two or more gamers are able to play a video games with one another on the monitors.

The present invention can deliver a video advertising impression to consumers in a remote location, as they are purchasing from or shopping in a retail environment and or a mall. The quality of these impressions is greatly enhanced by the medium itself. The newness of the mobile video wall and its place in the retail environment will create a first impression equal to no other impression. It can best be compared to the very first bus billboards, or bus benches, or billboards only more impressive due to its video nature with sight, sound, color, and motion Even further, in many cases this video wall and its messages will entertain most consumers.

Further objectives and advantages of the present invention will become apparent as the description proceeds and when taken in conjunction with the accompanying drawings. To gain a full appreciation of the scope of the present invention, it will be further recognized that various aspects of the present invention can be combined to make desirable embodiments of the invention.

Unless defined otherwise, all technical and scientific terms used herein have the same meaning as commonly understood by one of ordinary skill in the art to which this invention belongs. Where a term is provided in the singular, the inventor also contemplates the plural of that term. The nomenclature used herein and the procedures described below are those well known and commonly employed in the art.

I. An Audio/Video Based Interactive System

The present invention includes an audio/video based interactive system, including one or more motor vehicles. The motor vehicles of the present invention can be any type of motor vehicle, for example a car, a box truck, a boat, a ship, a yacht, a train, a recreational vehicle, a motorcycle, a tractor trailer truck, or a motor scooter. The motor vehicle of the present invention, much like nearly all types of motor vehicles may have a front end, a rear end, and a cabin. These motor vehicles generally have substantially flat surfaces in some locations of the motor vehicle, and may also have a plurality of windows in connection with one or more of these substantially flat surfaces. The substantially flat surfaces of the motor vehicles of the present invention are generally referred to as sidewalls of the cabin of the motor vehicle, whether or not the motor vehicle, such as for example a motorcycle, includes a traditional cabin. The side walls of the present invention are generally used to mount the monitors of the present invention.

The present invention may include one or more monitors including one or more speakers, wherein the one or more monitors are able to wirelessly receive and display live or pre-recorded content from a remote location. The monitors of the present invention may be any type or brand of monitors that are suitable for the purpose of the present invention. Preferably, the monitors of the present invention have flat screens and include high definition display technology. The monitors may be connected to other devices in connection with the motor vehicle, for example, a power source or power converter, computer, audio/video player/receiver, and/or video game console. Also, the monitor may be operationally connected to other types of devices, for example, a camera or video camera, one or more microphones, one or more signal receivers such as satellite dish and receiver and/or Wi-Fi and/or other internet receivers. All or some of these devices and equipment may be housed inside or outside the vehicle.

An important aspect of the present invention is that one or more monitors mounted inside or outside the cabin and facing outwardly from the motor vehicle for viewing from the outside of the one or more motor vehicles. The monitor may be inside the vehicle and facing outward, for example through a window, or the monitor may be mounted on the outside of the vehicle and facing outward. The monitors may be detachably mounted or fixedly mounted or a combination of both. In addition, the present invention may also include one or more monitors mounted inside of the vehicle for viewing from within the vehicle in addition to the one or more monitors facing outwardly for viewing from the outside of the vehicle.

The present invention also includes a call center able to generate and broadcast the live or pre-recorded content via one or more transmission means to the one or more monitors. The call center of the present invention may be a headquarter, where there are equipment for generating and broadcasting content to the monitors of the present invention, and/or the call center may also receive the content from a different source and then broadcast or transmit the same to the monitors of the present invention. From the call center, the content may be wirelessly broadcasted or transmitted by any suitable transmission means to the remote locations of the one or more vehicles. Transmission means may include any suitable wireless signal transmission means able to perform the purpose of the present invention, for example by means of a computers, the internet, Wi-Fi, and/or satellite or any other suitable broadcasting or transmitting means. The content sent from the call center or a remote location such as a vehicle of the present invention can be received by receiving vehicle of the present invention and displayed on the monitors. The receiving means may include any suitable wireless signal receiving means able to perform the purpose of the present invention, for example by means of a computer, satellite dish receiver and then displayed on the monitor, located on the remote vehicle facing outward such that persons outside the vehicle can watch the monitor. There are no limits to the type of content that can be generated or created and transmitted or broadcast and received and displayed by the monitors of the present invention. Anything and everything that can be generated and displayed on a monitor, for example from news to advertising, from live sporting events to the internet, text messaging, and photo sharing, from instructional programming and interactive product knowledge to video games can be generated and displayed by the present invention. Video games are immensely popular these days, and the present invention will allow players to engage one another from anywhere in the world and play video games for fun and competition. The live or pre-recorded contents can be displayed on the monitors of the present invention while the motor vehicle is moving and viewers on the road or sidewalks can view the displayed content, or the motor vehicle of the present invention may be parked and viewers can view the displayed content from outside the motor vehicle.

The present invention may also include one or more cameras and microphones in connection with the motor vehicle along with the one or more monitors of the motor vehicle, where live or pre-recorded content may be generate and broadcast or transmitted via one or more of the transmission means to the call center enabling a complete audio/video conferencing function. For example, a teleconference can be between a remote location where the motor vehicle of the present invention is located and the call center. The motor vehicle containing the essential devices and components—for transmitting or broadcasting live or pre-recorded content—can act like the call center of the present invention, communicating with other motor vehicles and/or the central call center. For example, two motor vehicles can communicate and transmit and receive content to and from one another and also with the call center. Where there are two or more vehicles containing the essential devices and components—for transmitting or broadcasting live or pre-recorded content—those motor vehicles can each act like the call center of the present invention, communicating with each other and/or the central call center. The central call center of the present invention will not be necessary when one or more of the motor vehicles can act like the call center, where each motor vehicle is capable of providing a mobile call center. Furthermore, the call center can be a mobile call center in a remote location away from the motor vehicles of the present invention, where live or pre-recorded content can be generated and transmitted to the motor vehicles. For example a mobile call center may be creating and broadcasting live content from a restaurant, and the broadcast may be transmitted to remote locations where the motor vehicles of the present invention are located. Or alternatively, the content may be generated or created at a remote location where the motor vehicle of the present invention is located, and then transmitted to the restaurant. It is important to note that there are not limits to the distance or range of broadcasting or transmission and receiving of the content of the present invention. Content may be generated at one specific location and be displayed at any location in the world, or alternatively, content may be generated anywhere in the world, and be displayed in one specific location.

All headings are for the convenience of the reader and should not be used to limit the meaning of the text that follows the heading, unless so specified. Various changes and departures may be made to the present invention without departing from the spirit and scope thereof. Accordingly, it is not intended that the invention be limited to that specifically described in the specification or as illustrated in the drawings, but only as set forth in the claims.

What is claimed is:

1. An audio/video based interactive system, comprising:
    a) one or more motor vehicles comprising a front end, a rear end, and a cabin comprising at least a first side wall and a second side wall;
    b) one or more monitors comprising receiving means and one or more speakers, said one or more monitors being able to wirelessly receive and display live or pre-recorded content, said one or more monitors directly mounted outwardly and away from said cabin on at least one of said first side wall and said second side wall of said one or more motor vehicles for viewing from the outside of said motor vehicle; and
    c) a call center able to generate and broadcast said live or pre-recorded content via one or more transmission means to said one or more monitors.

2. The audio/video based interactive system of claim 1, wherein said one or more monitors are detachably mounted outwardly and away on said side walls on the outside of said cabin.

3. The audio/video based interactive system of claim 1, wherein said one or more monitors are fixedly mounted outwardly and away on said side walls on the outside of said cabin.

4. The audio/video based interactive system of claim 1, wherein said one or more motor vehicles further comprise a remote camera comprising a microphone, said remote camera being able to generate and broadcast live or pre-recorded content via one or more transmission means to said call center enabling a complete audio/video conferencing function.

5. The audio/video based interactive system of claim 4, comprising two or more of motor vehicles, said two or more motor vehicles being able to communicate and broadcast said live or pre-recorded content with one another and said call center.

6. The audio/video based interactive system of claim 1, comprising two or more motor vehicles, wherein one or more of said two or more motor vehicles are able to act as said call center by further comprising a remote camera comprising a microphone, said remote camera being able to generate and broadcast live or pre-recorded content via one or more transmission means to the other vehicles of said audio/video based interactive system.

7. The audio/video based interactive system of claim 6, wherein said audio/video based interactive system comprises two or more motor vehicles that are operatively linked together via one of said one or more vehicles that is able to act as said call center, wherein two or more gamers are able to play a video game with one another on said monitors.

8. The audio/video based interactive system of claims 1, wherein said live or pre-recorded content is displayed on said one or more monitors while said motor vehicle is traveling.

9. The audio/video based interactive system of claims 1, wherein said live or pre-recorded content is displayed on said one or more monitors while said motor vehicle is parked.

10. The audio/video based interactive system of claim 1, wherein said audio/video based interactive system comprises two or more motor vehicles that are operatively linked together via said call center, wherein two or more gamers are able to play a video games with one another on said monitors.

11. The audio/video based interactive system of claim 1, wherein said live or pre-recorded content comprises advertising.

12. The audio/video based interactive system of claim 1, wherein said live or pre-recorded content comprises interactive product knowledge content.

13. The audio/video based interactive system of claim 1, wherein motor vehicle comprises a car, or a box truck, or a boat, or a ship, or a yacht, or a train, or a recreational vehicle, or a motorcycle, or a tractor trailer truck, or a motor scooter.

* * * * *